United States Patent
Gilad et al.

(10) Patent No.: US 12,514,247 B2
(45) Date of Patent: Jan. 6, 2026

(54) CRYOPRESERVED INSECTS AND METHODS FOR PRODUCING SAME

(71) Applicant: YEDA RESEARCH AND DEVELOPMENT CO. LTD., Rehovot (IL)

(72) Inventors: Yuval Gilad, Herzelia (IL); Yoav Politi, Kibbutz Nachshonim (IL); Idan Alyagor, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 730 days.

(21) Appl. No.: 17/783,431

(22) PCT Filed: Dec. 10, 2020

(86) PCT No.: PCT/IL2020/051275
§ 371 (c)(1),
(2) Date: Jun. 8, 2022

(87) PCT Pub. No.: WO2021/117042
PCT Pub. Date: Jun. 17, 2021

(65) Prior Publication Data
US 2023/0020006 A1 Jan. 19, 2023

Related U.S. Application Data

(60) Provisional application No. 62/945,908, filed on Dec. 10, 2019.

(51) Int. Cl.
*A01N 1/126* (2025.01)
*A01N 1/125* (2025.01)
*C12N 5/07* (2010.01)

(52) U.S. Cl.
CPC ............ *A01N 1/126* (2025.01); *A01N 1/125* (2025.01); *C12N 5/0601* (2013.01)

(58) Field of Classification Search
CPC ....... A01N 1/126; A01N 1/125; C12N 5/0601
See application file for complete search history.

(56) References Cited

U.S. PATENT DOCUMENTS

| 2012/0009590 A1 | 1/2012 | Rand |
| 2018/0360008 A1 | 12/2018 | Popa |

FOREIGN PATENT DOCUMENTS

| CN | 1748494 A | 3/2006 |
| CN | 103651334 A | 3/2014 |
| CN | 105724365 A | * 7/2016 |
| CN | 106305631 A | * 1/2017 |
| CN | 208211260 U | 12/2018 |

OTHER PUBLICATIONS

Rand et al., (2010) Permeabilization of *Drosophila* embryos for introduction of small molecules. Insect Biochem Mol Biol 40(11): 792-804.
Wang et al., (2000) Cryopreservation of *Musca domestica* (Diptera: Muscidae) embryos. Cryobiology 41(2): 153-166.
Caligiani et al., (2018) Influence of the killing method of the black soldier fly on its lipid composition. Food Research International, https://doi.org/10.1016/j.foodres.2018.08.033. Published in final edited form as: Food Res Int (2019) 116: 276-282. 7 pages.
Abidalla (2018) Morphogenesis of early embryonic development in the greater wax moth, *Galleria mellonella* (*Lepidoptera: Pyralidae*). Journal of Entomology 15(1): 1-12.
Abidalla and Roversi (2018) First Estimation of *Drosophila* EPS Solution for Permeabilizing Lepidoptera Galleria mellonella Embryos. Advances in Entomology 6: 213-225.
Augustinos et al., (2016) Cryopreservation of Embryos of the Mediterranean Fruit Fly *Ceratitis capitata* Vienna 8 Genetic Sexing Strain. PLoS One 11(8): e0160232.
Antonucci et al., (2011) Toxicological Assessment of 2-Methyltetrahydrofuran and Cyclopentyl Methyl Ether in Support of Their Use in Pharmaceutical Chemical Process Development. Org Process Res Dev 15(4): 939-941.
Berkebile et al., (2000) Permeabilization of Cochliomyia hominivorax (*Diptera: Calliphoridae*) embryos. J Med Entomol 37(6): 968-972.
Campos-Ortega and Hartenstein (1985) Stages of *Drosophila* Embryogenesis. In: The Embryonic Development of *Drosophila melanogaster*. Springer-Verlag Berlin Heidelberg. pp. 9-84.
Chia et al., (2018) Threshold temperatures and thermal requirements of black soldier fly Hermetia illucens: Implications for mass production. PLoS One 13(11): e0206097.
Clark et al., (2015) Opportunities for Bio-Based Solvents Created as Petrochemical and Fuel Products Transition towards Renewable Resources. Int J Mol Sci 16(8): 17101-17159.
Holmes et al., (2016) Lower temperature threshold of black soldier fly (*Diptera: Stratiomyidae*) development. Online. Published in final edited form as: Journal of Insects as Food and Feed 2(4): 255-262.
Leopold (2005) Colony maintenance and mass-rearing: using cold storage technology for extending the shelf-life of insects. FAO/IAEA International Conference on Area-Wide Control of Insect Pests: Integrating the Sterile Insect and Related Nuclear and Other Techniques. May 9-13, 2005, Vienna International Centre, Vienna, Austria. pp. 100-102.
Leopold and Rinehart (2010) A template for insect cryopreservation. In: Low Temperature Biology of Insects; Denlinger DL and Lee RE Jr editors). Cambridge University Press. pp. 325-341.
Leopold et al., (2001) Cryopreservation of Embryos of the New World Screwworm *Cochliomyia hominivorax* (*Diptera: Calliphoridae*). Annals of the Entomological Society of America 94(5): 695-701.

(Continued)

*Primary Examiner* — Sean C. Barron
(74) *Attorney, Agent, or Firm* — FULLER IP LAW LLC; Rodney J. Fuller (57) ABSTRACT

The present invention provides methods for cryopreservation of insect embryos comprising chorion layers and waxy layer, particularly fly embryos including embryos of Black Soldier Fly (*Hermetia illucens*, BSF) useful in mass rearing of beneficial fly adults. The present invention further provides cryopreserved embryos having an industrially suitable adult recovery and survival rate.

16 Claims, 4 Drawing Sheets

(56) References Cited

OTHER PUBLICATIONS

Leopold et al., (2010) Quality Testing of Three Species of Tephritid Fruit Flies After Embryo Cryopreservation. Annals of the Entomological Society of America 103(2): 264-272.

Li et al., (2017) Cryopreservation of Luciola praeusta Kiesenwetter (*Coleoptera: Lampyridae*) embryos by vitrification. Cryobiology 78: 101-105.

Luo et al., (2006) Cryopreservation of the late stage embryos of Spodoptera exigua (*Lepidoptera: Noctuidae*). Cryo Letters 27(6): 341-352.

Lynch et al., (1989) A two-step method for permeabilization of *Drosophila* eggs. Cryobiology 26(5): 445-452.

Mazur et al., (1992) Cryobiological preservation of *Drosophila* embryos. Science 258(5090): 1932-1935.

Rajamohan and Leopold (2007) Cryopreservation of Mexican fruit flies by vitrification: stage selection and avoidance of thermal stress. Cryobiology 54(1): 44-54.

Rajamohan et al., (2003) Cryopreservation of mediterranean fruit fly embryos. CryoLetters 24: 125-132.

Rajamohan et al., (2014) Cryopreservation of embryos of Lucilia sericata (*Diptera: Calliphoridae*). J Med Entomol 51 (2): 360-367.

Rand (2014) A Method of Permeabilization of *Drosophila* Embryos for Assays of Small Molecule Activity. J Vis Exp (89): e51634.

Rand et al., (2010) Permeabilization of *Drosophila* embryos for introduction of small molecules. Insect Biochem Mol Biol. Author manuscript; available in PMC Jan. 31, 2012. Published in final edited form as: Insect Biochem Mol Biol. Nov. 2010; 40(11): 792-804.

Ravi (2019) Alternative solvents for lipid extraction and their effect on protein quality in black soldier fly (*Hermetia illucens*) larvae. Journal of Cleaner Production 238: 117861.

Tsang and Chow (2012) Cryopreservation of Embryos from Model Animals and Human. In: Current Frontiers in Cryobiology, Prof. Igor Katkov (Ed.), ISBN: 978-953-51-0191-8, InTech, Available from: http://www.intechopen.com/books/current-frontiers-in-cryobiology/cryopreservation-of-embryos-of-modelanimals-and-human. Chapter 10, pp. 259-290.

Villazana and Alyokhin (2019) Tolerance of Immature Black Soldier Flies (*Diptera: Stratiomyidae*) to Cold Temperatures Above and Below Freezing Point. Journal of Economic Entomology 112(6): 2632-2637.

*Drosophila* Ringer's solution; Cold Spring Harbor Protocols (CSH Protocols). Retrieved from: http://cshprotocols.cshlp.org/content/2007/4/pdb.rec10919.full on Jul. 19, 2022. 1 page.

\* cited by examiner

CRYOPRESERVED INSECTS AND METHODS FOR PRODUCING SAME

FIELD OF THE INVENTION

The present invention provides methods for cryopreservation of insect embryos comprising chorion layers and waxy layer, particularly embryos of flies, including the Black soldier fly (BSF, *Hermetia illucens*), useful in mass rearing of beneficial fly adults, and cryopreserved embryos having a consistent recovery rate of healthy and fertile adults.

BACKGROUND OF THE INVENTION

Insects can be utilized for various applications such as pest management, protein production for the food and animal feed industries, production of materials for the pharmaceutical industry and more.

In order to support mass production of insects for these applications, their farming must be industrialized and scaled-up. Most of the insect factories today need to have in-site facilities for maintaining the entire life-cycle of the organism in order to obtain the desired growth stage of the insect and/or substances derived therefrom. The entire process includes breeding adult insects to produce eggs, which hatch into larvae. Food and water are provided to the larvae to facilitate growth and development. After a certain period of time (e.g., between one to six weeks, depending on the insect species), a larva initiates the process of metamorphosis into pupae and then into an adult insect.

Insect producers and also research institutes are developing novel lines of insects by means of genetic modification or classical breeding. Preservation of these lines is challenging since the only current method to do so is by maintaining a live colony. This process requires a significant amount of resources and can also end in loss of important genetic material due to natural genetic drifts in the population or to contaminations.

Furthermore, yield of eggs can vary dramatically from week to week and insect colonies often suffer from reduced productivity or even sudden collapse. This makes the self-production of eggs at each site inefficient and costly, and requires constant over-production of eggs in order to keep up with the production demand.

Large-scale cryopreservation of insect eggs may enable the decoupling of egg production from the other steps in the manufacture system of insects and/or insect substances. The ready-to-use cryopreserved eggs have an extended shelf-life (years or decades compared to a few days), and its use would increase the production capacity and improve the growth efficiency. The cryopreserved eggs must not only maintain the embryos viability, but also the ability of the embryos to reach the adult form. Reaching fertile adult form is a prerequisite for using cryopreserved eggs in the challenging task of preserving genetic lines for the various insect uses.

There is an ongoing research attempting at developing methods for successful cryopreservation and resuscitation of insects (see for example, Mazur P. et al., 1992. Science, 258:1932-1935; Leopold R A et al., 2001. Ann Ent Soc Am 94(5):695-701; Luo L et al., 2006. CryoLetters 27(6), 341-352; Tsang W H. and Chow K L. 2012. In: Current Frontiers in Cryobiology (Ed. Katkov I.) Chapter 10, pp. 259-281; Rajamohan A et al., 2014. J. Med. Entomol. 51(2): 360-367). Cryopreservation is a complicated process that requires trained personnel and special equipment. The literature describes small scale experiments which resulted in low yield of viable cryopreserved embryos and highly variable rates of adult flies developed from the cryopreserved embryos. Some insect species are more sensitive and hence require special methods for successful revivification after cryopreservation. Black soldier fly, for example, are sensitive to low temperatures, and are postulated to be a freeze-intolerant species (Villazana J, and A Alyokhin A. 2019. Journal of Economic Entomology, toz186, doi.org/10.1093/jee/toz186; Holmes L. A. et al., 2016, JIFF, 2(4): 255-262; Chia S Y, et al. 2018. PLoS ONE 13(11): e0206097. doi.org/10.1371/journal.pone.0206097).

U.S. Patent Application Publication No. 2012/0009590, related to the use of insect larva as research tool for high throughput screening of toxicology and biological activity of candidate compounds, discloses compositions and methods for permeabilizing insect embryos by removing the waxy layer of the shell using a solution containing a non-toxic cyclic terpene and a non-toxic surfactant, preferably a non-ionic surfactant. Recently, Abidalla and Roversi (Abidalla M and Roversi P F. 2018. Advances in Entomology 6:213-225) examined the use of the composition described in U.S. 2012/0009590 as permeabilization solution in cryopreservation of *Galleria mellonella*. However, while efficient permeabilization and load of the embryos with cryopreservation agents has been demonstrated, the survival rate of the cryopreserved embryos was negligible and the process was inconsistent.

Li et al. (Li K. et al., 2017. Cryobiology 78:101-5) described a method for cryopreservation of firefly embryos by dechorionating and permeabilizing the egg after manual inspection of the embryos' developmental stage, followed by cryoprotectant loading and vitrification. Satisfactory rates of larvae hatching after warming the embryos have been observed; however, larvae development into adult fly has not been followed. Moreover, this method is not applicable in larger scale.

There is a need for, and it would be highly advantageous to have, methods for successful and reproducible cryopreservation and revivification of embryos. Such embryos would advantageously serve for production of larva and/or fertile adults of beneficial insects.

SUMMARY OF THE INVENTION

The present invention answers the need for an economical and efficient way to generate stocks of transportable, stable embryos of beneficial insects, particularly embryos of the Black soldier fly (BSF, *Hermetia illucens*), which are required for the preservation of commercial genetic lines and/or in various steps of mass production of insects including breeding, larva production. The insects are for agricultural, medicinal, and research use as well as for use as feed, food or as a food product ingredient. The present invention provides methods for cryopreservation of fly embryos providing for constant-rate recovery of the embryos to viable, fertile adult form ready for breeding and mass production rearing according to the intended use. The methods of the present invention advantageously are suitable for extremely cold-sensitive fly species, including BSF. The present invention further provides cryopreserved fly embryos capable of larvae hatching, pupariation, emergence from pupae and mating.

The present invention is based in part on the unexpected discovery that permeabilization of the fly embryo waxy layer at a specific developmental stage with a permeabilization composition comprising limonene and the environmental-friendly organic solvent 2-methyl tetrahydrofuran (2-MeTHF, also known as 2-methyloxolane, CAS No. 96-47-9), is advantageous for loading the embryos with a cryoprotective agent (CPA). Subsequent freezing the embryos at insofar as possible uniform cryopreservation temperature followed by specific thawing conditions, results in commercially feasible and consistent hatching and survival rates. The methods of the present invention are advantageous over hitherto known methods for fly cryopreservation, at least in that the methods are also applicable at a medium- to large scale reproducible production of flies and result in a reproducible, percentage of the original embryo population taken for cryopreservation reaching adult fly stage in a healthy state. The present invention also provides, for the first time, an accurate embryonic developmental-stage timeline of BSF. Without wishing to be bound by any specific theory or a mechanism of action, exposing BSF embryos to the cryopreservation process at developmental stages 14-16 provides for the successful revivification of cryopreserved embryos of this cold-sensitive species.

According to one aspect, the present invention provides a method for a mass cryopreservation of fly embryos comprising:
 (a) removing chorion layers from at least a portion of a fly embryo surface, wherein the fly embryo is at a developmental stage of between the beginning of head involution and the end of midgut gastric caeca evagination, thereby obtaining a fly embryo surface having at least a portion of exposed waxy layer;
 (b) permeabilizing the exposed waxy layer by contacting said layer with a permeabilization composition comprising a permeabilizing compound selected from the group consisting of a cyclic terpene and/or an essential oil comprising same; an organic solvent; a surfactant and any combinations thereof, thereby obtaining an embryo having at least a portion of the waxy layer permeabilized;
 (c) loading the embryo obtained at step (b) with at least one cryoprotective agent (CPA), thereby obtaining an embryo loaded with the at least one CPA; and
 (d) exposing the embryo obtained at step (c) to a cryogenic temperature; thereby obtaining cryopreserved viable embryos.

According to certain embodiments, the permeabilization composition comprises a combination of permeabilizing compounds.

According to certain embodiments, the combination of permeabilizing compounds comprises at least one cyclic terpene and/or an essential oil comprising same and at least one organic solvent.

According to certain embodiments, the organic solvent is selected from the group consisting of biomass-based organic solvent and petroleum-based organic solvent.

According to certain embodiments, the biomass-based organic solvent is selected from the group consisting of 2-methyl tetrahydrofuran (2-MeTHF), cyclopentyl methyl ether (CPME), dimethyl ether, dimethyl carbonate, Ethyl lactate, Ethyl acetate, Methyl acetate, and any combination thereof. Each possibility represents a separate embodiment of the present invention.

According to certain embodiments, the biomass-based organic solvent is 2-MeTHF.

According to certain embodiments, the petroleum-based organic solvent is an alkane. According to some embodiments, the alkane is selected from the group consisting of heptane, hexane, octane and any combination thereof.

According to certain currently exemplary embodiments, the permeabilization composition comprises a combination of at least one cyclic terpene and/or an essential oil comprising same and 2-MeTHF.

According to certain exemplary embodiments, the permeabilization composition consists of the combination of the cyclic terpene and/or an essential oil comprising same and 2-MeTHF. According to these embodiments, the combination comprises the at least one cyclic terpene or the essential oil comprising same at a cyclic terpene concentration of from about 70% to about 95% v/v relative to the composition volume, and the 2-MeTHF at a concentration of from about 5% to about 30% v/v out of the total volume of the composition.

According to certain embodiments, the at least one cyclic terpene is selected from the group consisting of limonene, pinene (also known as myrcene), *Cannabis* derived cyclic terpene, eucalyptol (also known as cineole), carvone, linalool, caryophyllene and any combination thereof. Each possibility represents a separate embodiment of the present invention. According to some embodiments, the cyclic terpene is limonene. According to certain exemplary embodiments, the limonene is D-limonene.

According to certain embodiments, the combination of permeabilizing compounds comprises at least one cyclic terpene and/or an essential oil comprising same and at least one surfactant.

The at least one cyclic terpene is as described hereinabove. According to certain embodiments, the at least one surfactant is selected from the group consisting of alkyl poly(ethylene oxide), cocamide diethanolamine (DEA), ethoxylated alcohol, ethoxylated coconut alcohol, alcohol ethoxylate ($C_{9-11}$), copolymers of poly(ethyleneoxide) and poly(propylene oxide); alkyl polyglucosides; fatty alcohols; cocamide monoethanolamine (MEA); polysorbates, ethoxylated fatty alcohol ethers and lauryl ethers, ethoxylated alkyl phenols, octylphenoxypolyethoxy ethanol compounds, modified oxyethylated and/or oxypropylated straight-chain alcohols, polyethylene glycol monooleate compounds, polysorbate compounds, phenolic fatty alcohol ethers and any combination thereof. Each possibility represents a separate embodiment of the present invention. According to some embodiments, the at least one surfactant is selected from the group consisting of cocamide DEA, ethoxylated alcohol, polyethylene glycol, and a non-ionic surfactant.

According to certain embodiments, the permeabilization composition comprises a single permeabilizing compound. According to these embodiments, the permeabilizing compound is selected from the group consisting of an organic solvent and a cyclic terpene and/or an essential oil comprising same. The organic solvent and the cyclic terpene and/or an essential oil comprising same are as described hereinabove.

The concentration of each of the permeabilizing compounds or of a combination thereof within the permeabilization composition is such that said composition is not toxic to the fly embryos.

According to certain embodiments, the method further comprises revivification of the cryopreserved embryo. According to certain embodiments, the revivification comprises the steps of:
 (1) transferring a cryopreserved embryo to a revivification solution;
 (2) incubating the embryo in the revivification solution at a temperature of from about 20° C. to about 35° C.; optionally
 (3) replacing the revivification solution at least once; and (4) incubating the revivified embryo under hatching conditions suitable for obtaining a larva.

According to certain embodiments, the revivification further comprises incubating the larva under growth conditions suitable for obtaining pupation and subsequent emergence of an adult fly.

The transfer time of the cryopreserved embryo to the revivification solution should be kept as short as possible, at the range of seconds.

The hatching conditions will be determined according to the fly species as is known to a person skilled in the art.

According to certain embodiments, when the revivified embryo is of BSF, the hatching conditions comprise incubation at from about 25° C. to about 30° C. and 60-90% humidity. Incubation is performed on a suitable growth medium as is known in the art.

According to certain embodiments, the revivification of the embryo further comprise exposing said cryopreserved embryo to a temperature in the range of minus 70° C. to minus 150° C. prior to step (1).

According to certain embodiments, the entire cryopreservation process including removing the chorion layers, permeabilization and cryopreservation of the embryos occurs between the developmental stages 13 (beginning of head involution) to 17 (Air infiltration to tracheal tree).

According to certain exemplary embodiments, when the embryos are of BSF, the entire cryopreservation process including removing the chorion layers, permeabilization and cryopreservation of the embryos occurs between developmental stage 14A (Bolwig's organ like development) and stage 16 (midgut gastric caeca evagination).

According to certain embodiments, the exposure of the CPA loaded BSF embryo to cryogenic temperature is performed after embryonic posture rotation (stage 14B) which is a unique developmental feature of the Black soldier fly, disclosed in the present invention for the first time, and up to stage 16.

The age (time after egg laying—AEL) of the embryo at each developmental stage will depend on the fly species, and incubation conditions as is known to a person skilled in the art.

According to certain embodiments, the fly is selected from the group consisting of *Hermetia illucens* (Black soldier fly), *Ceratitis capitata* (Mediterranean fruit fly or medfly), *Drosophila melanogaster*, *Cochliomyia hominivorax* (screw-worm fly), *Anastrepha ludens* (Mexican fruit fly), *Musca domestica* (House fly), and Calliphoridae (blow flies).

The method of cryopreservation and revivification of the present invention is highly suitable for cold-sensitive fly embryos. According to certain exemplary embodiments, the fly is Black soldier fly, known to be highly susceptible to low temperatures, embryos of which have not been hitherto successfully cryopreserved and revivified. According to these embodiments, removing the chorion layer and permeabilizing the waxy layer (steps a-b), loading the embryo with at least one CPA and exposing the loaded embryo to cryogenic temperature (steps c-d) are performed with embryos at an age of from about 31 h to 60 h AEL. According to certain exemplary embodiments, steps a-d are performed at an embryo age of from about 35 h AEL to 50 h AEL. According to certain additional exemplary embodiments, steps a-d are performed at an embryo age of from about 38 h AEL to 48 h AEL. According to certain embodiments, the eggs are kept at a temperature of about 30° C. and humidity of more than 80%.

According to certain exemplary embodiments, removing the chorion layers from at least a portion of the embryo surface comprises contacting the embryo with a solution of sodium hypochlorite (NaClO). According to certain exemplary embodiments, the sodium hypochlorite is at a concentration ranging from 0.5% to 6%. According to specific exemplary embodiments, the sodium hypochlorite is at a concentration of about 1.5%. According to certain embodiments, the entire chorion layers are essentially removed.

According to certain embodiments, the method further comprises washing the embryo having at least a portion of exposed waxy layer obtained at step (a). According to certain embodiments, the embryo obtained at step (a) is washed with an aqueous solution. Any suitable aqueous solution as is known in the art can be used. According to certain exemplary embodiments, the aqueous solution is double-distilled (DD) $H_2O$.

Methods for loading at least one CPA to insect embryos are known in the art. According to certain embodiments, loading the embryo having at least a portion of the waxy layer permeabilized with at least one cryoprotective agent (CPA) comprises incubating said embryo in a solution comprising the at least one CPA for at least one incubation period. According to certain embodiments, the embryo is incubated in the solution comprising the at least one CPA for at least two incubation periods. According to certain exemplary embodiments, the embryo is incubated in the solution comprising the at least one CPA for four sequential incubation periods.

Typically, CPA loading is performed by gradual dehydration of the embryos by incubating said embryos in a hypertonic solution that increases water efflux from the embryos.

According to certain exemplary embodiments, the CPA is capable of penetrating through a membrane of at least part of the embryo cells. According to these embodiments, the solution comprising the at least one CPA further comprises at least one compound not capable of penetrating through the embryo cell membrane ("non-penetrating compound") which contribute to the hyperosmotic pressure of the composition. According to certain exemplary embodiments, the non-penetrating compound is selected from the group consisting of trehalose, polyvinylpyrrolidone (PVP), sucrose, mannitol, sorbitol, polyethylene glycol (PEG) and a combination thereof. Each possibility represents a separate embodiment of the present invention. According to certain embodiments, after each incubation time, the embryo is dried.

Any cryopreservation agent as is known in the art, typically a CPA capable of penetrating the embryo tissues can be used according to the teachings of the present invention. According to some embodiments, the CPA is selected from the group consisting of ethylene glycol, glycerol, DMSO (dimethylsulfoxide), propylene glycol, acetamide and any combination thereof. Each possibility represents a separate embodiment of the present invention.

According to certain exemplary embodiments, the CPA is ethylene glycol.

According to additional certain exemplary embodiments, the solution comprising the at least one CPA comprises ethylene glycol, trehalose and PVP.

According to certain embodiments, the concentration of the at least one CPA, the non-penetrating compound or of a combination thereof is gradually increased in the sequential incubation periods. According to these embodiments, the concentration of the at least one CPA, the non-penetrating compound, or of a combination thereof is gradually increased from about 10% to about 75% (v/v of the entire composition volume). According to some embodiments, the concentration of the at least one CPA, the non-penetrating compound or of a combination thereof is gradually increased from about 10% to about 65%.

The present invention now discloses that a commercially feasible process preferably comprises freezing the embryos uniformly and insofar as possible simultaneously. This may be achieved by exposing a plurality of permeabilized embryos containing the at least one CPA to a certain, uniform cryogenic temperature, resulting in the simultaneous freezing of a significant portion up to the entire embryo population. Without wishing to be bound by any theory or mechanism of action, the simultaneous exposure to a specific cryogenic temperature leads to vitrification and to the ability of the embryo to hatch and develop to a healthy, fertile adult fly form. The simultaneous exposure to a specific cryogenic temperature further leads to a high percentage of embryo hatch and to the ability to apply the method in industrial scale.

Any method as is known in the art for simultaneous exposure of the plurality of embryos to a certain uniform cryopreservation temperature can be used with the teachings of the present invention.

According to certain exemplary embodiments, the uniform cryopreservation temperature is provided by a pre-cooled horizontal surface. Using a pre-cooled horizontal surface enables exposure of the CPA-loaded embryos to relatively elevated cryogenic temperatures, in the range of minus 70° C. to minus 150° C.

Thus, according to certain exemplary embodiments, exposing the embryo comprising the at least one CPA to cryogenic temperatures comprises placing said embryo on a pre-cooled horizontal surface, the surface is at a temperature of minus 90° C., or minus 100° C., or minus 110° C., or minus 120° C. or minus 140° C.

According to additional exemplary embodiments, the uniform cryopreservation temperature is provided by a pre-cooled liquid. According to certain embodiments, the pre-cooled liquid is selected from the group consisting of ethanol, isopropanol, silicon oil, ethane, other liquids with appropriate freezing temperatures or any combination thereof. Each possibility represents a separate embodiment of the present invention. Using a pre-cooled liquid enables exposure of the CPA-loaded embryos to relatively high cryogenic temperatures, as described hereinabove.

According to certain embodiments, after exposing the embryo comprising the at least one CPA to cryogenic temperature said embryo is transferred to a temperature of minus 196° C. or minus 80° C. for storage.

According to certain alternative embodiments, exposing the embryo comprising the at least one CPA to cryogenic temperatures comprises placing said embryo at a temperature in the range of minus 110° C. to minus 135° C. followed by exposing said embryo to a temperature of minus 196° C. According to certain additional embodiments, exposing the embryo comprising the at least one CPA to cryogenic temperature comprises exposing said embryo to a temperature of minus 196° C.

According to certain exemplary embodiments, exposing the embryo to a temperature in the range of minus 110° C. to minus 135° C. is performed by exposing the embryo to liquid nitrogen vapors.

According to certain exemplary embodiments, exposing the embryo to a temperature of minus 196° C. comprises placing the embryo in a liquid nitrogen.

According to certain embodiments, the method comprises cryopreservation and revivification of a plurality of fly embryos. According to these embodiments, the method results in a reproducible percentage of revivified embryos reaching adult fly form. According to certain embodiments, at least 95%, preferably 99% and more of the adult flies are fertile. According to certain exemplary embodiments, the number of revivified embryos reaching adult fly form is from about 1% to about 10% of the number of adult fly form obtained from a corresponding plurality of non-cryopreserved fly embryos. Such reproducible, high percentage of fertile adult fly is of significance importance for maintaining desired genetic lines of flies for commercial and research purposes.

According to yet additional embodiments, the method comprising cryopreservation and revivification of a plurality of fly embryos results in a number of revivified embryos reaching adult fly form of at least 40% of the number of adult fly form obtained from a corresponding plurality of non-cryopreserved fly embryos. According to certain embodiments, the number of revivified embryos reaching adult fly form is at least 45%, 50%, 55%, 60%, 65%, 70% or more of the number of adult fly form obtained from a corresponding plurality of non-cryopreserved fly embryos. Each possibility represents a separate embodiment of the present invention.

The cryopreserved fly embryos, particularly BSF embryos of the present invention can be further used for mass production of larvae. According to certain embodiments, the cryopreservation and revivification of a plurality of BSF embryos results in a number of hatched larvae of at least 50%, 55%, 60%, 65%, 70%, 75%, 80% and more of the number of larvae hatched from a corresponding population of non-cryopreserved fly embryos.

Each possibility represents a separate embodiment of the present invention.

The method of cryopreservation and revivification of the present invention is also highly suitable for embryos of fly species having large eggs. According to certain embodiments, the large egg has a volume of at least 0.015 $mm^3$.

According to additional aspect, the present invention provides a plurality of highly cold-sensitive cryopreserved fly embryos, characterized in that the number of hatched larvae reaching fertile adult fly form is at least 1% of the number of adult fly form of larvae hatched from non-cryopreserved embryos. According to certain embodiments, the number is at least 2%, 3%, 4%, 5%, 10%, 20%, 30%, 40%, 45%, 50%, 55%, 60%, 65%, 70% or more of the number of adult fly form obtained from non-cryopreserved embryos.

According to certain embodiments, the number is between 1-10%.

According to certain exemplary embodiments, the present invention provides a plurality of cryopreserved Black soldier fly embryos, characterized in that the number of hatched larvae reaching fertile adult fly form is at least 1% to at least 10% of the number of adult fly form of larvae hatched from non-cryopreserved embryos. The cryopreserved BSF embryos can be stored for a long period of time, ranging from several weeks to at least one year when stored at a temperature of about minus 196° C.

According to certain embodiments, the plurality of cryopreserved fly embryos is provided within a kit further comprising at least one revivification solution.

According to another aspect, the present invention provides a kit for preparing fly embryos for cryopreservation, the kit comprising: a composition comprising sodium hypochlorite; permeabilization composition; at least one cryoprotective agent; and optionally instruction for using the kit component for cryopreservation of fly embryos.

According to certain embodiments, the kit further comprises washing solutions.

According to certain embodiments, the kit further comprises at least one revivification solution.

The compositions and instructions are as described hereinabove.

It is to be understood that any combination of each of the aspects and the embodiments disclosed herein is explicitly encompassed within the disclosure of the present invention.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

FIG. 2 shows the H&E staining of embryos without treatment (FIG. 2A) compare to ones after the peeling protocol (FIG. 2B).

FIG. 3 demonstrates vitrified embryos in liquid nitrogen after peeling and CPA loading (FIG. 3B) or without treatment (FIG. 3A). Transparent embryos indicate vitrification.

DETAILED DESCRIPTION OF THE INVENTION

The present invention provides methods for cryopreservation of fly embryos, wherein the flies are of species having commercial and/or research value, particularly embryos of the Black soldier fly. The methods of the present invention are advantageous over hitherto known methods for fly cryopreservation at least in that the percentage of embryos revivified after cryopreservation that reach healthy adult form has marketable value. In addition, the methods of the present invention are reproducible and can be performed under large, commercial scale. Being fertile, the revivified adult flies obtained by the teachings of the present invention can be used for the preservation of genetic strain, both for commercial and research purposes; as a backup for fly demand in a breeding facility; and for breeding. In addition, the high hatch rate of the cryopreserved fly embryos of the invention make them highly suitable for mass rearing of the fly larvae.

Definitions

As used herein, the term "fly" refers to an insect of the order Diptera. Among others, flies share a structure of eggshell comprising an outer chorion layers and underneath a waterproofing wax layer. The methods of the present invention can be employed with any Diptera species. According to certain embodiments, the fly is selected from the group consisting of *Hermetia illucens* (Black soldier fly, BSF), *Ceratitis capitata* (Mediterranean fruit fly or medfly), *Drosophila melanogaster*, screw-worm fly (*Cochliomyia hominivorax*), Mexican fruit fly (*Anastrepha ludens*), House fly (*Musca domestica*), and Calliphoridae (blow flies). *Hermetia illucens* and *Musca domestica* industrial rearing is widely used for feed and food industry and for waste management. *Ceratitis capitate, Cochliomyia hominivorax* and *Anastrepha ludens* are used for pest control. *Drosophila melanogaster* is typically used for genetic research and Calliphoridae for medical applications (maggot therapy). According to certain exemplary embodiments, the present invention is directed to cryopreservation and revivification of Black soldier fly embryos.

As used herein, the terms "adult fly", "adult flies" and "fly adult form" refer to the last stage of the fly's life-cycle, after hatching from the pupa.

The embryogenesis stages of the *Drosophila melanogaster* as used herein are adapted from the Bowne's stages by Campos-Ortega and Hartenstein (1985. The Embryonic Development of *Drosophila melanogaster*. Springer-Verlag, Berlin Heidelberg. pp 9-84).

Figure 1:
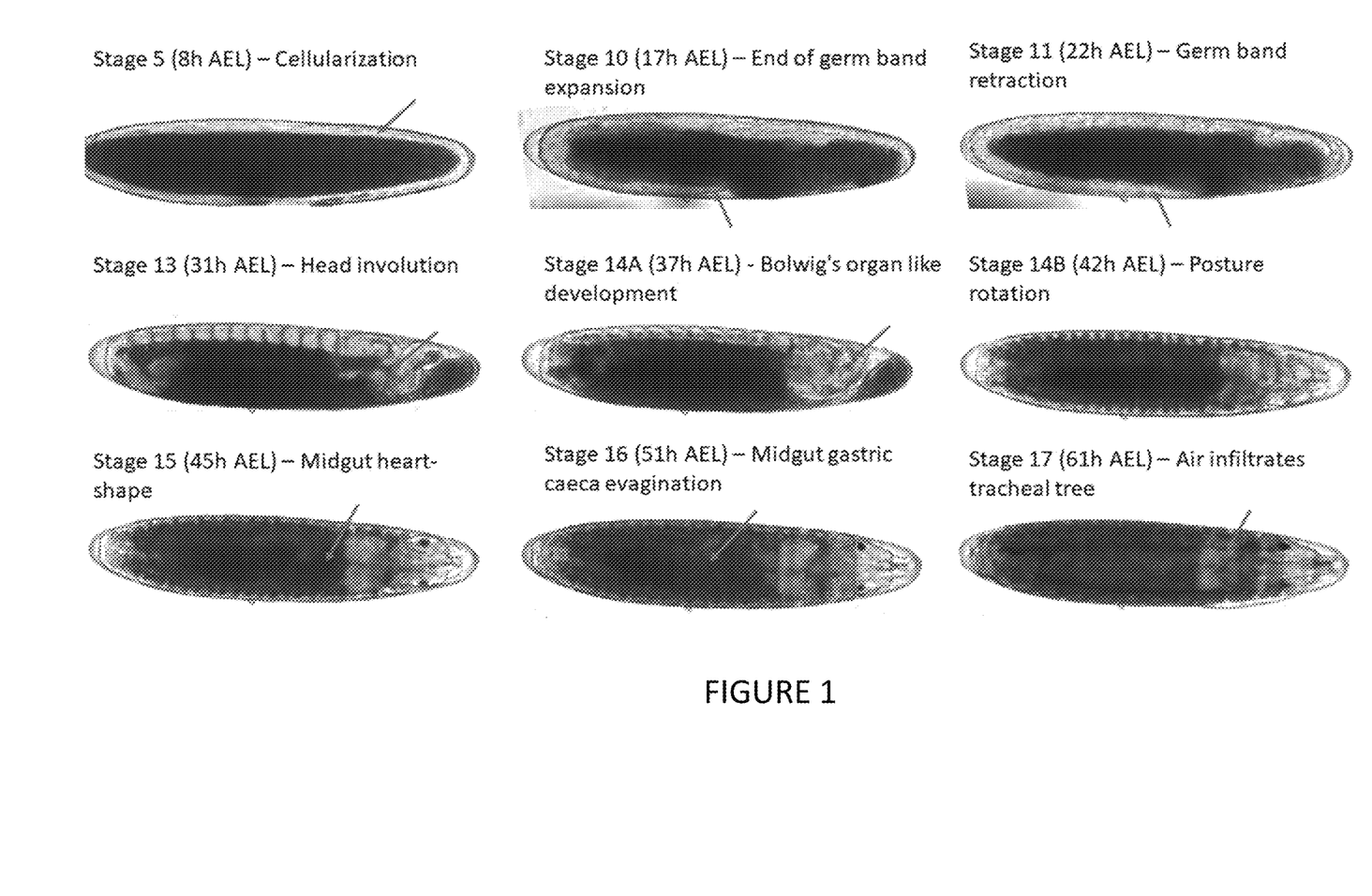
FIG. 1 presents key embryonic developmental stages of Black soldier fly and its time after egg laying (AEL), for embryos grown at a temperature of 30° C. and >90% humidity.

The embryogenesis stages of the Black soldier fly as used herein are characterized by the inventors of the present invention, and presented herein for the first time as described hereinbelow and in FIG. 1.

Unexpectedly, the present invention now shows that the embryo developmental stages at which the different steps of the cryopreservation methods are employed are of significant importance: high percentage of viable adult flies are obtained when the cryopreservation process is performed at specific developmental stages as described hereinabove. Without wishing to be bound by any specific theory or mechanism of action, exposing the CPA loaded embryos of BSF to the cryopreservation temperature at the time of posture rotation (stage 14B) is of significant importance.

As used herein, the term "cryopreservation" (or "cryoconservation") and corresponding verbs refer to a process where cells, whole tissue or entire organisms are preserved by cooling to very low temperatures (typically between minus 70° C. to minus 196° C.). At low enough temperatures, any enzymatic or chemical activity which might cause damage to the biological material or lead to further development is effectively stopped. Cryopreservation methods seek to reach low temperatures while avoiding/significantly reducing damage to the cell/tissue/organism caused by the formation of ice crystals during freezing, typically by optimally dehydrating the cells.

The term "vitrification" means transformation of a substance into a non-crystalline amorphous solid. As used herein, vitrification is a type of cryopreservation with the benefit of not causing damage due to ice crystal formation. According to the teaching of the present invention and without wishing to be bound by any theory or mechanism of action, the terms "cryopreservation" and "vitrification" may be used herein interchangeably.

The terms "revivification" and corresponding verbs, as well as "resuscitation" and corresponding verbs are used herein interchangeably and refer to the process of bringing the cryopreserved cells or tissues to a viable and active state, typically by thawing.

The terms "permeabilization", related verbs and "permeable" with reference to the layers surrounding the fly embryo, particularly the waxy layer, refer to the ability of compounds or agents to pass through the layers more readily and reach the cells of the embryo enclosed therein. Particularly, the terms refer to an increase in the ability of compounds or agents not typically permeable through the waxy layer to reach the embryo cells. According to certain exemplary embodiments of the present invention, the agents are cryopreservation agents (CPA).

As used herein, the term "permeabilization composition" refers to a composition comprising at least one compound the activity of which enhances the permeabilization of a layer surrounding the fly embryo to another compound or agent. Several permeabilization compositions can be used according to the teachings of the present invention, each of which enhances the fly embryo waxy layer permeability to at least one CPA.

The term "not toxic" as used herein with reference to the permeabilization composition refers to a composition comprising each of the permeabilizing compounds or the combination thereof at a concentration which does not have a significant deleterious effect on the fly embryo health and enables its development to an adult form under optimal growth conditions without cryopreservation.

As used herein, the term "cryopreservation agent" (CPA) refers to a substance that is used to protect insect cells, particularly fly embryonic cells from freezing damage. Further, the cryopreservation agent (may be also referred to as "cryoprotectant") may protect the embryo cells from cold and heat shock, dehydration, and cryo-toxicity during cryopreservation. The cryopreservation agent may be cell penetrating or non-penetrating.

Non-limiting examples of cryoprotectants include glycerol, ethylene glycol, DMSO (dimethyl sulfoxide), propylene glycol, acetamide, and methanol.

As used herein, the term "contacting" with reference to the fly embryo or part thereof and a compound or composition is meant bringing the embryo or part thereof and the compound or composition to close proximity such that the compound or composition can affect the embryo or part thereof. According to certain embodiments, the term "contacting" refers to incubating or rinsing the embryo or part thereof in a composition, or intracellularly administering the compound or composition to the embryo or part thereof.

As used herein, the terms "corresponding plurality of non-cryopreserved fly embryos" and "corresponding adult fly form of larvae hatched from non-cryopreserved embryos" refers to the typical percentage of embryos reaching adult fly form wherein the eggs and hatched larvae are grown under suitable conditions. It is to be explicitly understood that suitable growth conditions do not include cryopreservation. Black soldier fly survival rate from eggs to adults is about 50-80%.

As used herein, the term "large egg" with reference to fly eggs refers to eggs with a volume larger than 0.015 mm$^3$.

As used herein, the term "pre-cooled horizontal surface" refers to any device, tool, implement, appliance or instrument of various shapes capable of reaching and maintaining low temperatures, with an even temperature distribution throughout the surface.

As used herein, the term "pre-cooled liquid" refers to any liquid which is capable of maintaining low temperatures, with an even temperature distribution throughout the liquid. According to certain embodiments, the liquid is selected from the group consisting of ethanol, isopropanol, silicon oil, ethane and other liquids with appropriate freezing temperatures.

Black soldier flies (*Hermetia illucens*) are highly sensitive to cold conditions (temperature of below 16° C.) throughout their life-cycle, specifically during the embryonic stage. Therefore, exposing BSF embryos to cryopreservation temperature may be fatal to the embryos. In addition, cooling the most internal part of embryos of fly species having large eggs, including BSF, is a challenging task as the inner embryo tissue are not cooled to the desired temperature. Currently, no successful cryopreservation of BSF embryos, particularly in medium- to large scale production, has been reported.

As used herein, the term "about" is to be understood as within a range of normal tolerance in the art, for example within 2 standard deviations of the mean. About can be understood as within ±10%, 9%, 8%, 7%, 6%, 5%, 4%, 3%, 2%, 1%, 0.5%, 0.1%, 0.05%, or 0.01% of the stated value. All values provided herein are understood to be modified by the term about.

According to one aspect, the present invention provides a method for cryopreservation of fly embryo comprising:
  (a) removing chorion layers from at least a portion of a fly embryo surface, wherein the fly embryo is at a developmental stage of between the beginning of head involution and before the end of midgut gastric caeca evagination, thereby obtaining a fly embryo surface having at least a portion of exposed waxy layer;
  (b) permeabilizing the exposed waxy layer by contacting said layer with a permeabilization composition comprising a permeabilizing compound selected from the group consisting of a cyclic terpene and/or an essential oil comprising same; an organic solvent; a surfactant and any combination thereof,
    thereby obtaining an embryo having at least portion of the waxy layer permeabilized;
  (c) loading the embryo obtained by step (b) with at least one cryoprotective agent (CPA), thereby obtaining an embryo loaded with the at least one CPA; and
  (d) exposing the embryo obtained by step (c) to a cryogenic temperature, thereby obtaining cryopreserved viable embryo.

According to certain embodiments, prior to peeling the embryos, the surface is dehydrated by incubation with isopropanol, followed by drying in the air.

According to certain exemplary embodiments, removing the chorion layers from at least a portion of the embryo surface comprises contacting the embryo with a solution of sodium hypochlorite (NaClO). According to certain exemplary embodiments, the sodium hypochlorite is at a concentration ranging from 0.5% to 6%. According to specific exemplary embodiments, the sodium hypochlorite is at a concentration of about 1.5%. According to certain embodiments, the entire chorion layers are essentially removed.

According to certain embodiments, the permeabilization composition comprises a combination of permeabilizing compounds.

According to certain embodiments, the combination of permeabilizing compounds comprises at least one cyclic terpene and/or an essential oil comprising same and at least one organic solvent.

A terpene is an organic compound including at least one isoprene unit (having the formula $C_5H_8$). A cyclic terpene includes a saturated or unsaturated 6-member carbon ring in addition to an isoprene substituent. According to certain exemplary embodiments, the cyclic terpene is derived from a natural source, for example limonene, including D-limonene (derived from citrus); cineole (derived from eucalyptus); linalool (derived from a wide variety of scent plants); carvone (derived from a variety of plants, but mainly from seeds of caraway, spearmint, and dill), pinene (derived mainly from conifers but present also in *Cannabis*); caryophyllene (derived mainly from cloves, *Cannabis sativa*, rosemary, and hops) and additional *Cannabis* derived cyclic terpenes. The cyclic terpene may be present in the composition in an isolated form or may form part of corresponding essential oil.

According to certain exemplary embodiments, the cyclic terpene is selected from the group consisting of limonene, pinene, *Cannabis* derived cyclic terpene and any combination thereof. Each possibility represents a separate embodiment of the present invention.

According to some embodiments, the cyclic terpene is limonene. According to certain exemplary embodiments, the limonene is D-limonene.

According to some embodiments, the non-toxic cyclic terpene is pinene.

According to some embodiments, the non-toxic cyclic terpene is derived from *Cannabis*.

Organic solvents used for lipid extraction from plant and animal tissues are typically petroleum-based organic solvent, of which alkanes, including hexane, heptane and octane are most widely used. However, these organic solvents react with free pollutants to form ozone, photo chemicals and, for example hexane is said to affect the neural system when inhaled by humans. Therefore, there is an ongoing research for aiming at replacement of petrochemical solvents with economically feasible, alternative environmental-friendly organic solvents (Clark J H et al., 2015. Int. J. Mol. Sci. 16:17101-17159; doi:10.3390/ijms160817101; Ravi H K et al. 2019. Journal of Cleaner Production 238: 117861). As these alternatives are typically produced from biological mass, they are referred to herein as "biomass-based organic solvents".

According to certain embodiments, the biomass-based organic solvent is selected from the group consisting of 2-methyl tetrahydrofuran (2-MeTHF), cyclopentyl methyl ether (CPME), dimethyl ether, dimethyl carbonate, Ethyl lactate, Ethyl acetate, Methyl acetate, and any combination thereof. Each possibility represents a separate embodiment of the present invention.

According to certain embodiments, the petroleum-based organic solvent is an alkane. According to certain embodiments, the alkane is selected from the group consisting of hexane, heptane and octane. Each possibility represents a separate embodiment of the present invention.

Alkanes have been previously reported as effective permeabilization agents enabling the penetration of cryopreservation agents into insect embryos; however, when applied in effective concentration and incubation time, the alkanes negatively affected the embryos viability, hatching rate and capability to develop after hatching. The combination of naturally derived cyclic terpene and alkane according to the teachings of the present invention reduced the toxicity of the alkane while preserving the effective permeabilization capacities. The ratio between the alkane and the terpene range between 1:3 to 3:1 respectively with concentration between 30% to 66% v/v for each of the alkane/cyclic terpene.

According to certain exemplary embodiments, the permeabilization composition comprises at least one non-toxic cyclic terpene or an essential oil comprising same at a concentration of 50%; and alkane at a concentration of from about 50%. In the course of searching for environmental-friendly substitutes for alkane, the inventors of the present invention have found that 2-MeTHF can not only replace alkane in terms of equivalent permeabilization activity, but it also shows even milder negatively effect on the embryos health and normal develop when combined with at least one cyclic terpene.

According to certain exemplary embodiments, the permeabilization composition consists of the combination of the cyclic terpene and/or an essential oil comprising same and 2-MeTHF. According to these embodiments, the combination comprises the at least one cyclic terpene or the essential oil comprising same at a cyclic terpene concentration of from about 70% to about 95% v/v relative to the composition volume, and the 2-MeTHF at a concentration of from about 5% to about 30% v/v out of the total volume of the composition. According to certain exemplary embodiments, the combination comprises the at least one cyclic terpene or the essential oil comprising same at a cyclic terpene concentration of from about 80% to about 90% v/v relative to the composition volume, and the 2-MeTHF at a concentration of from about 10% to about 20% v/v out of the total volume of the composition. According to certain currently exemplary embodiments, the combination comprises D-limonene and 2-MeTHF.

According to certain embodiments, the combination of permeabilizing compounds comprises at least one cyclic terpene and/or an essential oil comprising same and at least one surfactant.

The at least one cyclic terpene is as described hereinabove.

Surfactants (surface acting agents) are typically organic amphiphilic compounds (i.e., containing both hydrophobic groups and hydrophilic groups), and therefore are soluble in both organic solvents and water. Surfactants can be used to solubilize compounds that are only slightly or not completely soluble in either an aqueous or organic solvent. Surfactants reduce the surface tension of water by adsorbing at the liquid-gas interface. They also reduce the interfacial tension between oil and water by adsorbing at the liquid-liquid interface. Surfactants can be chemically synthesized or can be naturally occurring, or chemically modified naturally occurring compounds. Examples of such detergents include those specified on pages 295-298 of McCutcheon's Emulsifiers & Detergents, North American edition (2008), published by the McCutcheon Division of MC Publishing Co., (USA). Detergents are typically surfactants. Surfactants are commonly divided into groups based on their charge, for example, anionic (e.g., based on sulfate, sulfonate or carboxylate anions), cationic (based on quaternary ammonium cations), zwitterionic (amphoteric), and non-ionic (e.g., alkyl poly (ethylene oxide) such as ethoxylated castor oil (CAS #61791-12-6) and ethoxylated coconut alcohol (CAS #68131-39-5); copolymers of poly(ethylene oxide) and poly (propylene oxide); alkyl polyglucosides; fatty alcohols; cocamide MEA, cocamide DEA; and polysorbates). Surfactants can also be divided into groups based on their molecular weight, their critical micelle concentration (CMC) and micelle molecular weight (mMW).

Non-ionic surfactants include, but are not limited to, ethoxylated fatty alcohol ethers and lauryl ethers, ethoxylated alkyl phenols, octylphenoxy polyethoxy ethanol compounds, modified oxyethylated and/or oxypropylated straight-chain alcohols, polyethylene glycol monooleate compounds, polysorbate compounds, and phenolic fatty alcohol ethers. Non-ionic detergents include alcohol ethoxylates, for example $C_{9-11}$ chain length, $C_{8-12}$ chain length, $C_{9-12}$ chain length and diethanolimide or diethanolamine, particularly derived from natural sources such as cocoanut.

According to certain exemplary embodiments, the at least one surfactant is ethoxylated alcohol. According to other exemplary embodiments, the at least one surfactant is cocamide DEA.

According to certain embodiments, the permeabilization composition comprises at least one non-toxic cyclic terpene or an essential oil comprising same at a concentration of from about 0.2% to about 10% and at least one surfactant at a concentration of from about 0.1% to about 3%. According to some embodiments, the concentration of the at least one surfactant is from about 0.1% to about 2%, or from about 0.1% to about 1%, or from about 0.1% to about 0.5%. According to certain exemplary embodiments, the permeabilization composition comprises at least one non-toxic cyclic terpene or an essential oil comprising same at a concentration of 3% and at least one non-toxic surfactant at a concentration of from about 0.33%.

According to certain embodiments, the permeabilization composition comprises a single permeabilizing compound.

According to some embodiments, the single permeabilizing agent is an alkane.

As described herein above, while being effective in permeabilizing the waxy layers, alkanes have deleterious effects on the embryos. Therefore, maintaining viability of the embryos while using very high concentrations of up to 100% alkane in effective incubation time, according to the teaching of the present invention, is not obvious, especially when performed on sensitive embryos and in larger scales.

According to certain embodiments, the permeabilization composition comprising alkane as a single permeabilizing compound comprises alkane at a concentration of from about 50% to about 100% alkane (v/v based on the total volume of the composition 0. According to certain embodiments, the alkane concentration is from about 75% to about 100% alkane. According to certain embodiments, the composition comprises above 90% alkane, above 91%, above 92%, above 93%, above 94%, above 95%, above 96%, above 97%, above 98%, or above 99% alkane. According to certain exemplary embodiments, the composition comprises 100% alkane. According to certain embodiments, the alkane is selected from the group consisting of hexane, heptane, octane and any combination thereof. Each possibility represents a separate embodiment of the present invention.

According to certain embodiments, the composition comprises hexane as a sole permeabilizing compound. According to certain embodiments, the composition comprises above 90% hexane, above 91%, above 92%, above 93%, above 94%, above 95%, above 96%, above 97%, above 98%, or above 99% hexane. According to certain exemplary embodiments, the composition comprises 100% hexane. According to certain exemplary embodiments, the composition comprises heptane as a sole permeabilizing compound. According to certain embodiments, the composition comprises above 90% heptane, above 91%, above 92%, above 93%, above 94%, above 95%, above 96%, above 97%, above 98%, or above 99% heptane. Each possibility represents a separate embodiment of the present invention. According to certain exemplary embodiments, the composition comprises 100% heptane.

The concentration, type of the alkane and incubation time would depend on the fly species to be cryopreserved.

According to alternative embodiments, the permeabilization composition comprises, as the sole permeabilizing active compound, at least one non-toxic cyclic terpene and/or an essential oil comprising same. According to some embodiments, the concentration of the at least one cyclic terpene or the essential oil comprising same is from about 2% to about 40% v/v.

According to some embodiments, the concentration of the at least one cyclic terpene or the essential oil comprising same is from about 2% to about 30% v/v.

According to some embodiments, the concentration of the at least one cyclic terpene or the essential oil comprising same is from about 2% to about 20% v/v.

According to some embodiments, the concentration of the at least one cyclic terpene or the essential oil comprising same is from about 2% to about 10% v/v.

According to some embodiments, the concentration of the at least one cyclic terpene or the essential oil comprising same is from about 2% to about 5% v/v.

According to certain exemplary embodiments, the concentration of the at least one cyclic terpene or the essential oil comprising same is about 3% v/v.

According to certain embodiments, the at least one cyclic terpene or essential oil comprising same is diluted in an aqueous buffer. Non-limiting examples of suitable aqueous buffer include phosphate buffered saline (PBS) or Ringer solution. According to these embodiments, the method further comprises forming a suspension just before contacting the permeabilization composition with the embryos having at least a portion of exposed waxy layer.

According to certain embodiments, the permeabilization composition consists of at least one non-toxic cyclic terpene or an essential oil comprising same.

According to certain embodiments, the embryos taken for cryopreservation are at a developmental stage of between the beginning of head involution, and before the end of air infiltration to tracheal tree designated as stages 13-17. According to certain exemplary embodiments, embryos of the BSF are taken for cryopreservation at developmental stages 14-16.

According to certain embodiments, the method further comprises washing the embryo having at least a portion of the waxy layer permeabilized so as to remove the permeabilization composition. According to certain embodiments, the embryos are washed at least once with isotonic solution. Repeated washes can be performed with the same or different isotonic solutions as are known in the art.

According to certain embodiments, the surface of the washed embryos is dried, typically by incubating the washed embryos in isopropanol or a composition comprising same.

Methods of loading embryos having at least a portion of the waxy layer permeabilized with CPA(s) are known in the art. According to certain exemplary embodiments, the CPA is a compound capable of penetrating the embryo tissue selected from the group consisting of, ethylene glycol, glycerol, DMSO, propylene glycol, acetamide, methanol, glycerol and any combination thereof. Each possibility represents a separate embodiment of the present invention.

According to certain exemplary embodiments, the CPA is ethylene glycol.

According to certain embodiments, the CPA is loaded by incubating the permeabilized embryos with a composition comprising said CPA. According to certain exemplary embodiments, loading is performed by employing subsequent incubation periods. According to theses embodiments, the CPA concentration is elevated at each subsequent additional incubation period. Without wishing to be bound by any theory or mechanism of action, the gradual increase in the CPA concentration decrease the deleterious effects of the embryo dehydration resulting from the replacement of the embryo water with the CPA.

According to certain embodiments, the CPA is loaded by incubating the permeabilized embryos with a composition comprising said CPA, for at least two, at least three or at least four incubation periods. According to certain exemplary embodiments, four sequential incubation periods are applied, each for from about 1 min. to about 20 min.

According to certain embodiments, the CPA concentration in the first incubation period is from about 5% to about 20% (v/v). According to certain exemplary embodiments the CPA concentration in the first incubation period is from about 10% to about 15% (v/v). According to these embodiments, the incubation time is from about 5 min. to about 10 min.

According to certain embodiments, the concentration of the CPA in the second incubation period is from about 15% to about 30% (v/v). According to certain exemplary embodiments the CPA concentration in the second incubation period is from about 20% to about 25% (v/v). According to these embodiments, the incubation time is from about 5 min. to about 10 min.

According to certain embodiments, the concentration of the CPA in the third incubation period is from about 35% to about 55% (v/v). According to certain exemplary embodiments the CPA concentration in the third incubation period is from about 40% to about 50% (v/v). According to these embodiments, the incubation time is from about 5 min. to about 10 min.

According to certain embodiments, the concentration of the CPA in the fourth incubation period is from about 45% to about 65% (v/v). According to certain exemplary embodiments the CPA concentration in the second incubation period is from about 50% to about 55% (v/v). According to these embodiments, the incubation time is from about 5 min. to about 10 min.

According to certain embodiments, the composition comprising the CPA is an insect growth medium further comprises at least one of non-penetrating compound contributing to the hyperosmotic pressure of the composition, at least one antibiotic agent, fetal calf serum (FCS) and any combinations thereof.

According to certain exemplary embodiments, the non-penetrating compound is selected from the group consisting of trehalose, polyethylene glycol (PEG), Polyvinylpyrrolidone (PVP) and a combination thereof. Each possibility represents a separate embodiment of the present invention.

Any method as is known in the art for uniform, typically simultaneous exposure of the plurality of embryos to a certain uniform cryopreservation temperature can be used with the teachings of the present invention.

According to certain embodiments, cryopreservation temperature is performed by placing the plurality of embryos in liquid nitrogen having a temperature of minus 196° C.

According to certain embodiments, the uniform cryopreservation temperature is provided by a pre-cooled horizontal surface. Using a pre-cooled horizontal surface enables exposure of the CPA-loaded embryos to relatively elevated cryogenic temperatures, in the range of minus 70° C. to minus 150° C. This optional method of the present invention is advantageous over hitherto methods in the percentage of viable embryos which may be obtained after thawing the cryopreserved embryos. This method allows for relatively even freezing of all the embryos, increasing the uniformity of the frozen embryos, thereby increasing the embryos survival rate as well as enabling the use of the present invention for large scale production.

According to certain embodiments, exposing the embryo comprising the at least one CPA to cryogenic temperatures comprises placing said embryo on a pre-cooled horizontal surface, the surface is at a temperature of minus 70° C., or minus 80° C., or minus 90° C., or minus 100° C., or minus 110° C., or minus 120° C., or minus 130° C., or minus 135° C., or minus 140° C. or minus 150° C.

According to additional embodiments, the uniform cryopreservation temperature is provided by a pre-cooled liquid. According to certain embodiments, the pre-cooled liquid is selected from the group consisting of ethanol, isopropanol, silicon oil, ethane, other liquids with appropriate freezing temperatures or any combination thereof. Each possibility represents a separate embodiment of the present invention. Using a pre-cooled liquid enables exposure of the CPA-loaded embryos to relatively high cryogenic temperatures of between minus 80° C. to minus 150° C. According to certain embodiments, when the fly is BSF, the CPA-loaded BSF embryos are exposed to cryogenic temperatures of between minus 110° C., to minus 1350° C.

According to certain embodiments, after exposing the embryo comprising the at least one CPA to cryogenic temperature said embryo is transferred to or maintained at temperature of minus 196° C. or minus 80° C. for storage.

The vitrification/cryopreservation temperature and method of achieving same (either using pre-cooled surface or liquid) will be determined according to the fly species as is known to a person skilled in the art.

According to certain embodiments, the method further comprises revivification of the cryopreserved embryo. According to certain embodiments, the revivification comprises the steps of:
(1) transferring the cryopreserved embryo to a revivification solution;
(2) incubating the embryo in the revivification solution at a temperature of from about 20° C. to about 35° C.; optionally
(3) replacing the revivification solution at least once; and
(4) incubating the revivified embryo under hatching conditions to obtain larva.

According to certain embodiments, the revivification method further comprises incubating the larva under growth conditions to obtain adult fly.

The hatching conditions will be determined according to the fly species as is known to a person skilled in the art.

According to certain embodiments, the revivification of the embryo further comprise exposing said cryopreserved embryo to a temperature in the range of minus 70° C. to minus 150° C. prior to step (1).

According to certain exemplary embodiments, incubating the cryopreserved embryo in a revivification solution comprises sequential incubation periods, wherein the concentration of CPA in said revivification composition is reduced in each subsequent incubation period. According to certain embodiments, the cryopreserved embryo is incubated in a revivification solution for at least two, at least three or at least four time periods of from about 0.5 min to about 2 min.

According to certain exemplary embodiments, the cryopreserved embryo is incubated in a revivification solution comprising from about 35% to about 45% CPA for a first incubation time of about 1 min.

According to certain exemplary embodiments, the cryopreserved embryo is incubated in a revivification solution comprising from about 15% to about 25% CPA for a second incubation time of about 1 min about 1 min.

According to certain exemplary embodiments, the cryopreserved embryo is incubated in a revivification solution comprising no CPA for at least one additional incubation time of about 1 min about 1 min.

According to certain embodiments, the revivification solution further comprises at least one non-penetrating compound contributing to the hyperosmotic pressure of the composition. The non-penetrating compound is as described hereinabove.

According to certain exemplary embodiments, the hatching conditions comprise placing the embryos in agar melted in a medium selected from the group consisting of Ringer medium, PBS, Schneider medium or directly in a thin layer of the medium (for enabling enough oxygen availability) or in a medium enriched with oxygen.

The hatched larvae are then grown on normal diet and growth conditions depending on the fly species, as are known in the art.

According to additional aspect, the present invention provides a plurality of cryopreserved fly embryos, characterized in that the number of hatched larvae reaching adult fly form is at least 1% of the number of corresponding adult fly form of larvae hatched from non-cryopreserved embryos. According to certain embodiments, the number is at least 2%, 3%, 4%, 5%, 10%, 20%, 30%, 40%, 45%, 50%, 55%, 60%, 65%, 70% or more of the number of adult fly form obtained from non-cryopreserved embryos. According to certain embodiments, the number is between 1-10%.

According to additional aspect, the present invention provides a plurality of cryopreserved fly embryos of highly cold-sensitive fly species, characterized in that the number of hatched larvae reaching adult fly form is at least 1% of the number of corresponding adult fly form of larvae hatched from non-cryopreserved embryos. According to certain embodiments, the number is at least 2%, 3%, 4%, 5%, 10%, 20%, 40%, 45%, 50%, 55%, 60%, 65%, 70% or more of the number of adult fly form obtained from non-cryopreserved embryos. According to certain embodiments, the number is between 1-10%.

According to certain exemplary embodiments, the cold-sensitive fly species is BSF.

According to additional aspect, the present invention provides a plurality of cryopreserved fly embryos, characterized in that the number of hatched larvae reaching adult fly form is at least 1% of the number of corresponding adult fly form of larvae hatched from non-cryopreserved embryos, wherein the embryos are of a fly species having large egg. According to certain embodiments, the number is at least 2%, 3%, 4%, 5%, 10%, 20%, 40%, 45%, 50%, 55%, 60%, 65%, 70% or more of the number of adult fly form obtained from non-cryopreserved embryos. According to certain embodiments, the number is between 1-10%.

According to another aspect, the present invention provides a kit for preparing fly embryos for cryopreservation, the kit comprising: a composition comprising sodium hypochlorite; permeabilization composition; at least one cryoprotective agent; optionally a revivification solution; and optionally instruction for using the kit component for cryopreservation of fly embryos.

According to certain embodiments, the kit further comprises washing solutions.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1: Black Soldier Fly Embryo Developmental Stages

In order to map the embryonic development of the Black soldier fly (BSF), time lapse imaging of the BSF embryos was performed under high resolution confocal microscope and key developmental events were compared with the characterized stages of the fruit fly *Drosophila melanogaster*.

Black soldier fly embryos were grown at a temperature of 30° C. with 90% relative humidity and imaged every 30 minutes, until larval hatching. Identification of Black soldier fly embryogenesis stages was performed by comparing snapshots from the movie to known hallmarks of *D. melanogaster* embryogenesis stages as defined by Campos-Ortega and Hartenstein (1985. The Embryonic Development of *Drosophila melanogaster*. Springer-Verlag, Berlin Heidelberg. pp. 9-84). The embryonic posture rotation is a unique feature observed in all embryos imaged (n=5) and was never previously reported in embryonic development of other fly species. FIG. 1 portrays the embryonic developmental stages of Black soldier fly.

Example 2: Cryopreservation and Revivification of BSF Embryos

Protocol 1
Permeabilization Composition:
Composition comprised of 14% 2-methyl tetrahydrofuran (2-MeTHF) and 86% D-Limonene
Media:
Schneider's medium (Biological industries, 01-150-1A), 10% Fetal craft serum and 1% antibiotic antimycotic Solution (Biological industries, 03-033-1B).

Eggs of Black soldier fly were collected at 0-2 h after egg laying (AEL) and then incubate at 30° C. and high humidity until 38-48 h AEL, which are developmental stages 14-16.
Permeabilization was Performed as Follows:
 a. Incubating the eggs with sodium hypochlorite (NaClO) (1.5%) for 60 seconds.
 b. Washing with DDW for 1 minute;
 c. Incubation of the dried eggs with isopropanol for 3-10 sec;
 d. Drying the washed eggs on paper;
 e. Incubation of the dried eggs in the permeabilization solution for 30-90 sec.;
 f. Drying the eggs on a paper followed by air dry for 30-90 sec.;
 g. 5 quick washes in PBS;
 h. Incubation in NaOH (10%) for 30-90 sec.
 i. 2 quick washes in PBS.
Loading of Cryopreservation Agent (CPA) was Performed by the Following Steps:
 a. Incubation of the permeabilized eggs in Schneider medium comprising 10% ethylene-glycol, 0.25M trehalose, 5% FCS, and 1% antibiotics for 10 min in RT;
 b. Incubation of the permeabilized eggs of step (a) in Schneider medium comprising 20% ethylene-glycol, 0.25M trehalose, 5% FCS, and 1% antibiotics for 10 min in RT;
 c. Incubation of the permeabilized eggs of step (b) in Schneider medium comprising 40% ethylene-glycol, 0.5M trehalose, 10% FCS, and 1% antibiotics for 10 min in RT; and
 d. Incubation of the permeabilized eggs of step (c) in Schneider medium comprising 50% ethylene-glycol, 0.5M trehalose, 10% FCS, and 1% antibiotics for 10 min in RT.
The eggs loaded with the CPA are ready for cryopreservation.

Vitrification

Embryos were placed on a thin copper mesh (with 40-110 um pores) or a polycarbonate Nucleopore Whatman paper (LifeGene, 110414). Excess liquid was removed and the embryos were freezed using tweezers directly in liquid nitrogen (minus 196° C.).

Thawing was Performed as Follows:
a. The eggs were thawed in a strainer placed in Schneider medium comprising 40% ethylene glycol, 0.75M trehalose, and 1% antibiotics for 1 min.; followed by
b. Incubation in Schneider medium comprising 20% ethylene glycol, 0.5M trehalose, and 1% antibiotics for 1 min.; followed by
c. Incubation in Schneider medium comprising 10% ethylene glycol, 0.5M trehalose, and 1% antibiotics for 1 min.; followed by
d. Incubation in Schneider medium comprising 0.5M trehalose and 1% antibiotics for 1 min.; followed by
e. Incubation in Schneider medium comprising 0.25M trehalose, 1% antibiotics for 1 min.; followed by
f. Two washes of 10 minutes each in Schneider medium comprising 10% FCS; followed by
g. Incubate in Schneider medium comprising 10% FCS until hatching.

Protocol 2

The permeabilization of the eggs was performed as described in Protocol 1 above.

Loading of Cryopreservation Agent (CPA) was Performed by the Following Steps:
a. Incubation of the permeabilized eggs in Schneider medium comprising 10% ethylene-glycol, 0.125M trehalose, 5% PVP, and 1% antibiotics for 10 min.;
b. Incubation of the permeabilized eggs in Schneider medium comprising 20% ethylene-glycol, 0.125M trehalose, 5% PVP, and 1% antibiotics for 10 at room temperature (RT);
c. Incubation of the permeabilized eggs in Schneider medium comprising 40% ethylene-glycol, 0.25M trehalose, 10% PVP, and 1% antibiotics for 10-min at RT;
d. Incubation of the permeabilized eggs in Schneider medium comprising 53% ethylene-glycol, 0.25M trehalose, 10% PVP, and 1% antibiotics for 5 min at RT.

The eggs loaded with the CPA are ready for cryopreservation.

Fast Freeze:

The embryos were placed on a thin polycarbonate Nucleopore Whatman paper (LifeGene, 110414) or a thin copper mesh (with 40-110 um pores). Excess liquid was removed and the embryos were freeze using tweezers directly in liquid nitrogen.

Thawing was Performed by the Following Steps:
a. The eggs were thawed in a strainer placed in Schneider medium comprising 0.75M trehalose, 2% PVP, and 1% antibiotics in for 1-2 min.;
b. Incubation in Schneider medium comprising 0.5M trehalose, 2% PVP, and 1% antibiotics for 1-2 min.;
c. Incubation in Schneider medium comprising 0.5M trehalose and 1% antibiotics for 1-2 min.;
d. Incubation in Schneider medium comprising 0.25M trehalose and 1% antibiotics for 1-2 min.;
e. Two washes of 2-3 minutes each in Schneider medium;
f. One wash of 2-3 minutes in Schneider medium comprising 10% FCS; and
g. Incubate in Schneider medium comprising 10% FCS until hatching.

Figure 2A:
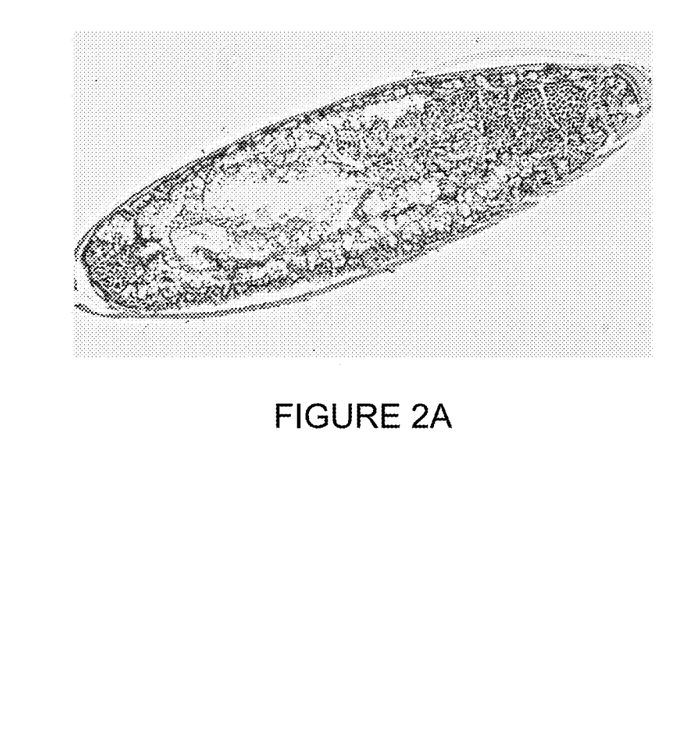
Figure 2B:
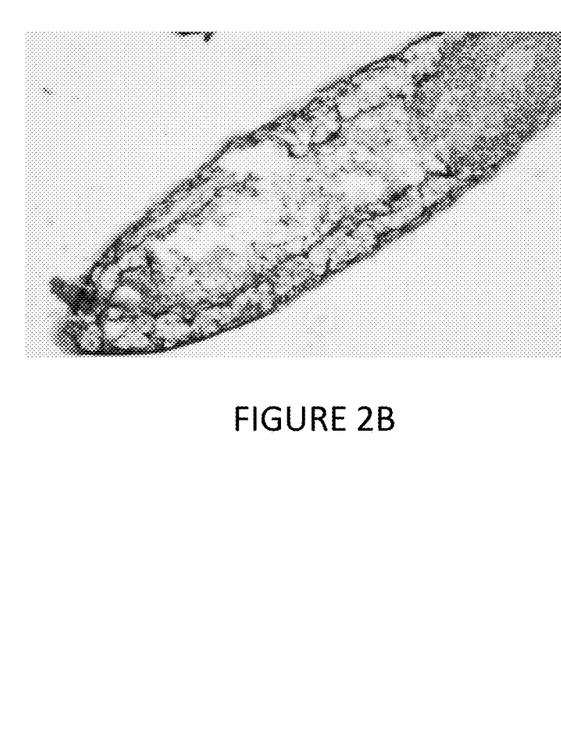

FIG. 2 shows the H&E staining of embryos without treatment compared to ones after the peeling protocol. Most of the egg layers were removed after the peeling treatment.

Figure 3A:
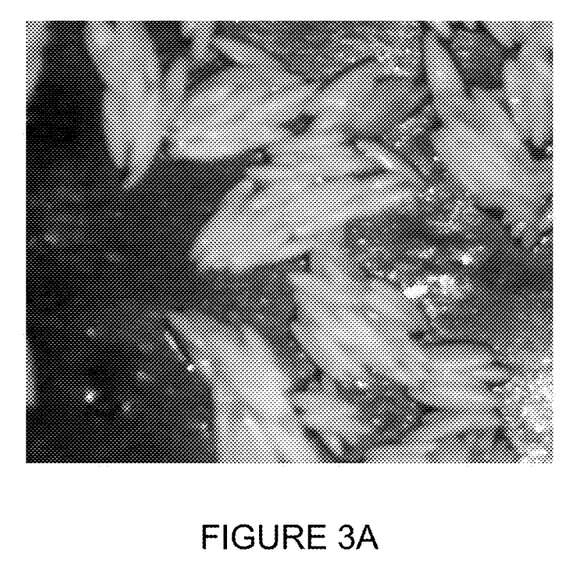
Figure 3B:
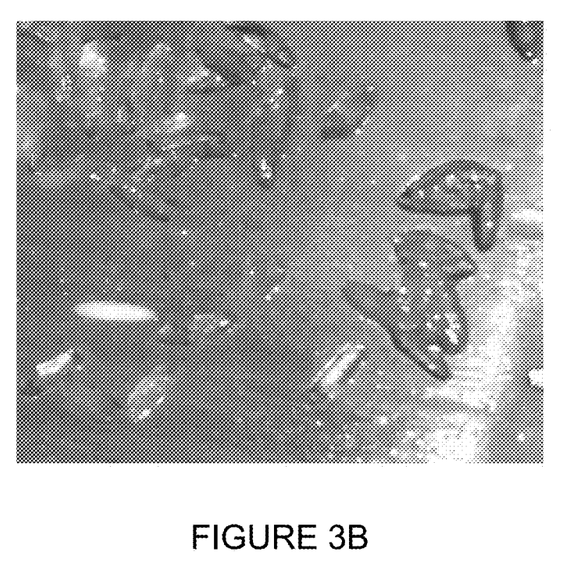

FIG. 3 shows vitrified embryos on a Nucleopore Whatman paper in liquid nitrogen after the described peeling and CPA loading protocol or without treatment. The white color of the untreated embryos represents the ice crystal inside them which does not exist in most of the treated ones.

Figure 4:
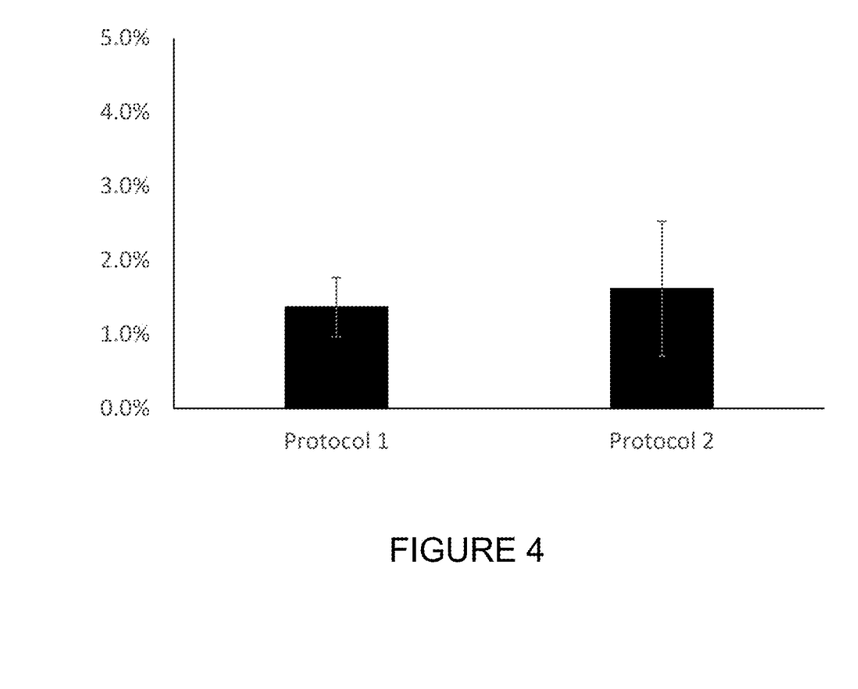
FIG. 4 shows the hatching rate of Black soldier fly embryos cryopreserved and revivified according to Protocols 1 and 2 of the present invention.

FIG. 4 shows that both cryopreservation and revivification protocols resulted in a hatching rate of more than 1% hatching. The hatched larva showed equivalent development rate to adult (more than 90%) and fertility was verified for two generations.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A method for cryopreservation of Black soldier fly (*Hermetia illucens*) embryos comprising:
a. removing chorion layers from at least a portion of a Black soldier fly (BSF) embryo surface, wherein the BSF embryo is at a developmental stage of between the beginning of Bolwig's organ like development and the end of midgut gastric caeca evagination to obtain a BSF embryo surface having at least a portion of an exposed waxy layer;
b. permeabilizing the exposed waxy layer by contacting the layer with a permeabilization composition comprising a permeabilizing compound selected from the group consisting of a cyclic terpene and/or an essential oil comprising a cyclic terpene; an organic solvent; a surfactant; and a mixture thereof to obtain an embryo having at least a portion of the waxy layer permeabilized;
c. loading the embryo having at least a portion of the waxy layer permeabilized with at least one cryoprotective agent (CPA) to obtain an embryo loaded with the at least one CPA; and
d. exposing the embryo loaded with the at least one CPA to a cryogenic temperature to obtain a cryopreserved viable embryo.

2. The method of claim 1, wherein the permeabilization composition comprises a mixture of permeabilizing compounds consisting of at least one cyclic terpene and/or an essential oil comprising at least one cyclic terpene; and at least one organic solvent.

3. The method of claim 2, wherein the organic solvent is selected from the group consisting of:
(i) a biomass-based organic solvent selected from the group consisting of 2-methyl tetrahydrofuran (2-MeTHF), cyclopentyl methyl ether (CPME), dimethyl ether, dimethyl carbonate, ethyl lactate, ethyl acetate, methyl acetate, and a mixture thereof; and
(ii) a petroleum-based organic solvent selected from the group consisting of heptane, hexane, octane, and a mixture thereof.

4. The method of claim 3, wherein the permeabilization composition comprises a mixture of permeabilizing compounds consisting of at least one cyclic terpene and/or an essential oil comprising at least one cyclic terpene and 2-MeTHF.

5. The method of claim 1, wherein the permeabilization composition comprises a mixture of permeabilizing compounds consisting of at least one cyclic terpene and/or an essential oil comprising at least one cyclic terpene; and at least one surfactant.

6. The method of claim 1, wherein the at least one cyclic terpene is selected from the group consisting of limonene, pinene, *Cannabis* derived cyclic terpene, eucalyptol, carvone, pinene, linalool, caryophyllene, and a mixture thereof.

7. The method of claim 1, wherein the permeabilization composition consists of a single permeabilizing compound selected from the group consisting of an organic solvent, a cyclic terpene and an essential oil comprising a cyclic terpene.

8. The method of claim 7, wherein the organic solvent is an alkane selected from the group consisting of hexane, heptane, and octane, and the cyclic terpene is selected from the group consisting of limonene, pinene, *Cannabis* derived cyclic terpene, eucalyptol, carvone, pinene, linalool, and caryophyllene.

9. The method of claim 1, wherein the method further comprises revivification of the cryopreserved embryo, the revivification comprising the steps of:
   e. optionally, exposing the cryopreserved embryo to a temperature in the range of minus 70° C. to minus 150° C.;
   f. transferring the cryopreserved embryo to a revivification solution;
   g. incubating the embryo in the revivification solution at a temperature of from about 20° C. to about 35° C.;
   h. optionally, replacing the revivification solution at least once; and
   i. incubating the revivified embryo under hatching conditions suitable for obtaining a larva.

10. The method of claim 9, wherein the revivification method further comprises incubating the hatched larva under growth conditions suitable for obtaining pupation and subsequent emergence of an adult fly.

11. The method of claim 1, wherein removing the chorion layers from at least a portion of the embryo surface comprises contacting the embryo with a solution of sodium hypochlorite (NaClO).

12. The method of claim 1, wherein loading the embryo having at least a portion of the waxy layer permeabilized with at least one cryoprotective agent (CPA) comprises incubating the embryo in a solution comprising the at least one CPA for at least one incubation period.

13. The method of claim 1, wherein the CPA is a compound capable of penetrating through a membrane of at least part of the embryo cells and is selected from the group consisting of ethylene glycol, glycerol, DMSO (dimethylsulfoxide), propylene glycol, acetamide, and a mixture thereof, and wherein the solution comprising the CPA optionally further comprises at least one compound not capable of penetrating through a membrane of at least part of the embryo cells selected from the group consisting of trehalose, polyvinylpyrrolidone (PVP), sucrose, mannitol, sorbitol, polyethylene glycol (PEG), and a mixture thereof.

14. The method of claim 1, wherein exposing the embryo loaded with the at least one CPA to a cryogenic temperature comprises exposing the embryo to a uniform cryogenic temperature of from minus 70° C. to minus 150° C.

15. The method of claim 1, wherein exposing the embryo loaded with the at least one CPA to a cryogenic temperature comprises exposing the embryo to a temperature of minus 196° C., optionally placing the embryo at a temperature in the range of minus 110° C. to minus 135° C. prior to exposing the embryo to a temperature of minus 196° C.

16. The method of claim 9, wherein the method comprises cryopreservation and revivification of a plurality of BSF embryos, characterized by at least one of the following:
   the number of revivified embryos reaching adult fly form is at least 1% of the number of adult fly form obtained from a corresponding plurality of non-cryopreserved BSF embryos; and
   the number of larvae hatched from the revivified embryos is at least 50% of the number of larvae hatched from a corresponding population of non-cryopreserved BSF embryos.

* * * * *